J. WACHNIAK.
AUTOMOBILE SLED.
APPLICATION FILED FEB. 21, 1920.
1,342,410.
Patented June 1, 1920.
2 SHEETS—SHEET 1.
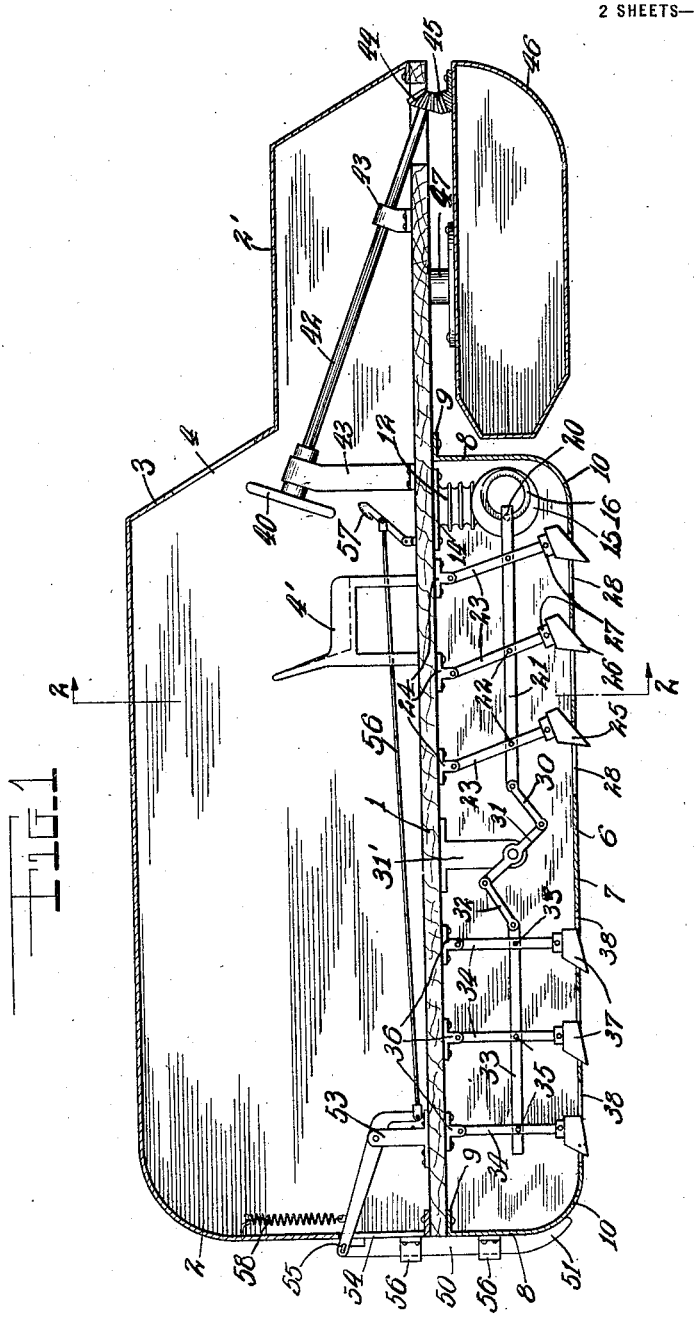
INVENTOR.
John Wachniak
BY
George C. Heinrich
ATTORNEY.

J. WACHNIAK.
AUTOMOBILE SLED.
APPLICATION FILED FEB. 21, 1920.
1,342,410.
Patented June 1, 1920.
2 SHEETS—SHEET 2.
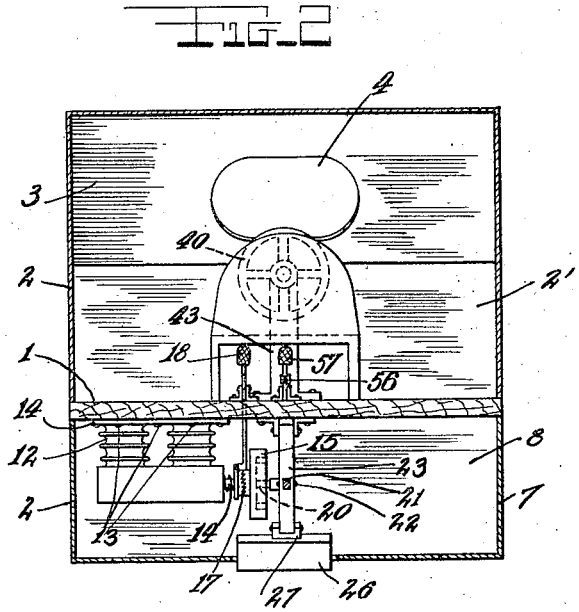
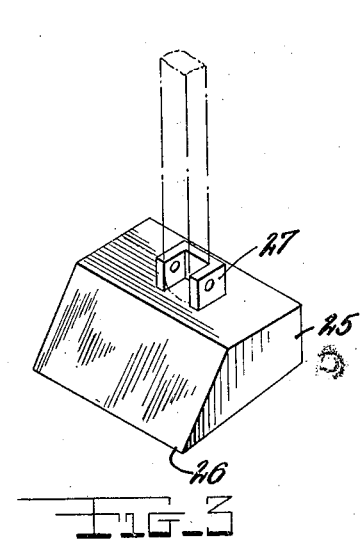
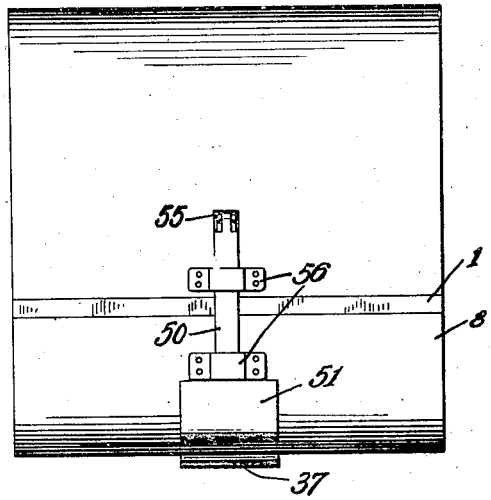
INVENTOR.
John Wachniak
BY
George C. Heinicke
ATTORNEY.

UNITED STATES PATENT OFFICE.

JOHN WACHNIAK, OF NEW YORK, N. Y.

AUTOMOBILE SLED.

1,342,410.     Specification of Letters Patent.     Patented June 1, 1920.

Application filed February 21, 1920. Serial No. 360,542.

*To all whom it may concern:*

Be it known that I, John Wachniak, a citizen of Canada, residing at New York, county of New York, and State of New York, have invented certain new and useful Improvements in Automobile Sleds, of which the following is a specification.

This invention relates to motor driven sleds, and particularly to a sled driven by reciprocatory devices which act with a kicking motion to propel the sled forward.

The invention has for a general object to provide a motor driven sled characterized by simplicity and cheapness of construction, a further object being to provide a novel arrangement whereby the propelling impulses may be practically continuous without any noticeable interval of time therebetween.

For further comprehension of the invention, and of the objects and advantages thereof reference will be had to the following description and accompanying drawings, and to the appended claims in which the various novel features of the invention are more particularly set forth.

Figure 1 of the drawings is a longitudinal vertical sectional view of a motor sled constructed according to the invention.

Fig. 2 is a transverse sectional view taken on the line 2—2 of Fig. 1.

Fig. 3 is a detail perspective view of one of the gripping blocks.

Fig. 4 is a rear view of the sled.

As here shown my improved sled is formed with a flooring 1 extending the complete width and length thereof, and upon which may be mounted a suitable housing 2 for the occupant or occupants, the forward end 2' of this housing being diminished in height, and the wall 3 joining this forward end with the roof of the housing having a sight opening 4 which may be closed by a glass pane, not shown. This flooring is rigidly fixed on a box-like runner member or element having a flat bottom 6 and side and end walls 7 and 8 respectively, the latter having horizontal flanges 9 at their upper ends to which the floor 1 is suitably secured. The bottom 7 forms the main running surface of the sled and is preferably rounded upwardly at its front and rear ends as at 10.

The propelling mechanism of the sled comprises a motor 12, such as a gasolene motor, which is secured to the underside of the floor 1 by suitable means such as the bolts 13 taking through a flange formed on the upper ends of the motor cylinders, this motor projecting downwardly into the box-like runner element near the forward end thereof. Loosely mounted on the main shaft 14 of the motor is a fly-wheel having an eccentric circular groove 16 in its outer face. This fly-wheel is adapted to be operatively connected to the motor shaft by a clutch 17 of ordinary construction operated by a foot pedal 18.

Projecting into the groove 16 in the fly-wheel 15 is a pin 20 which is fixed in the forward end of a horizontal pitman-bar 21 which extends longitudinally of the sled. This link-bar 21 is pivotally connected, as indicated at 22, to each one of a series of arms 23 which are arranged one behind the other and pivoted at their upper ends, to swing longitudinally of the sled, in brackets 24 fixed to the underside of the floor 1. Pivotally mounted in the lower ends of these arms 23 are the blocks 25 which are illustrated most clearly in Fig. 3, and have their rear edges beveled or sharpened as at 26 to bite into the packed snow or ice. The pivot points of these blocks are disposed toward the forward edges thereof so that the sharpened rear edges will rest by gravity on the snow. These blocks have U-shaped projections 27 on their upper faces to which the arms are attached, the cross members of these projections being adapted to bear against the arms to limit the downward swinging movement of the beveled edges 26 of the blocks. Openings 28 are provided in the bottom 6 of the sled to accommodate these blocks.

Connected to the rear end of the pitman-bar 21 is a link 30 which also connects to one end of a walking beam 31 pivoted midway between its ends on a bracket 31' depending from the floor 1. The opposite end of this walking beam is connected by a link 32 to a second pitman-bar 33 which extends rearwardly in line with the first pitman-bar 21 across a second series of arms 34, similar to the arms 23, to each of which it is pivotally connected as indicated at 35. These arms 34 are pivoted at their upper ends in brackets 36 similar to the brackets 24 and have blocks 37 similar to the blocks 25 pivotally attached on their lower ends, these blocks 37 projecting through openings 38 in the bottom 6.

The sled is steered by means of a handwheel 40 of the type ordinarily used on automobiles which is located in front of the driver's seat 41 and is fixed on the rear end of an inclined shaft 42 journaled in brackets 43 on the floor 1, the forward end of this shaft projecting through an opening 44 in the forward end of floor 1 and having a bevel gear 45 on its ends which engages a bevel segment 45 fixed on the forward end of a box-like steering runner 46 pivoted at 47 to the underside of the floor 1, the latter projecting forwardly of the main runner element and over the steering runner.

I also provide a braking device which comprises a vertical bar 50 slidable in brackets 56 on the rear of the sled and having its lower end forwardly curved as at 51. A bell crank lever is fulcrumed on a bracket 53 on the floor near the rear end thereof, and has one arm projecting rearwardly through a slot 54 in the housing 2 and connected by a slot and pin connection 55 to the upper end of the bar 50. The other arm of this bell crank lever is connected by a forwardly extending rod 56 to a foot pedal adjacent the driver's seat. A tension spring 58, connected at one end to the bell crank lever and at its other end to the rear wall of the housing 2, normally holds the bar 50 raised clear of the surface on which the sled rests.

It is believed the manner of operation of my improved sled will be readily understood from the foregoing description. It is to be understood that the motor will have its control mechanism located adjacent the driver's seat. It will be apparent that when the motor is started and fly-wheel 15 is rotating, the engagement of pin 20 in the eccentric groove 16 will cause the pitman-bar 21 to be longitudinally reciprocated, causing the arm 23 to oscillate and the blocks 25 to move backward and forward. As the blocks 25 move backward their sharpened rear edges 26 bite into the surface on which the sled rests and cause the sled to move forwardly, the blocks moving forwardly over the said surface freely on their return movement, the length of the arms 23 and the pivotal points of the blocks being calculated so as to cause this action of the blocks.

When the pitman-bar 21 moves backwardly it swings the end of the walking beam 31 to which it is connected backwardly, also, the other end of the walking beam swinging forwardly, and imparting forward movement to the rear set of blocks 37 through link 32, pitman-bar 33 and arms 34, the blocks operating on the surface on which the sled travels similarly to the blocks 25. It will be obvious then that as one set of blocks is moving forward the other set is moving backward and that a practically continuous and uninterrupted impulse will be given the sled.

A detailed explanation of the operation of the steering and braking devices is not deemed necessary, it being apparent that when wheel 40 is turned the runner 46 is also turned to one side or the other, and that when foot pedal 57 is depressed the bar 50 is thrust downwardly, the spring 58 automatically raising it when the foot pedal is released.

While I have indicated only one seat in the drawings it is to be understood that the sled may be arranged to seat as many persons as desired and that the housing may be provided with suitable doors and windows in addition to the opening 4.

Having thus described my invention what I claim as new and desire to secure by Letters Patent, of the United States is as follows—

1. In a sled, a motor, a pair of reciprocatory thrust devices adapted to engage the surfaces on which the sled is traveling, and means for causing said thrust devices to move in opposite directions to one another in unison, said means including a walking beam, and a connection between opposite ends of said walking beam and the respective devices.

2. In a sled, a motor, a series of arms pivoted at their upper ends to swing longitudinally of the sled, a pitman-bar connecting said arms to operate together, blocks hinged to the lower ends of said arms and having sharpened rear edges pressing downwardly on the surface on which the sled is traveling, and an operative connection between said pitman-bar and the motor, said connection comprising a wheel on the motor shaft having an eccentric circular groove on its outer face, and a part carried by said pitman-bar engaging in said groove.

3. In a sled, a motor, a series of arms pivoted at their upper ends one behind the other to swing longitudinally of the sled, a pitman-bar connecting said arms to operate together, blocks hinged to the lower ends of said arms and having sharpened rear edges passing downwardly on the surface on which the sled is traveling, a second series of similar arms pivoted at their upper ends one behind the other in a common plane, a pitman-bar connecting said arms to operate together, blocks on the lower ends of said arms similar to the first mentioned blocks, an operative connection between said first mentioned blocks and the motor, and an operative connection between the two pitman-bars whereby they are caused to move in unison in opposite directions.

4. In a sled, a motor, a series of arms pivoted at their upper ends one behind the other to swing longitudinally of the sled, a pitman-bar connecting said arms to operate together, blocks hinged to the lower ends of said arms and having sharpened rear edges passing downwardly on the surface on which the sled is traveling, a second series of similar arms pivoted at their upper ends one behind the other in a common plane, blocks on the lower ends of said arms similar to the first mentioned blocks, an operative connection between said first mentioned blocks and the motor, and an operative connection between the two pitman-bars whereby they are caused to move in unison in opposite directions, said connection including a walking beam arranged between the two sets of arms.

In testimony whereof I have affixed my signature.

JOHN WACHNIAK.